United States Patent [19]

Aguilar

[11] Patent Number: 4,943,194

[45] Date of Patent: Jul. 24, 1990

[54] TRUCK CARGO SAFEGUARD

[76] Inventor: Alfonso Aguilar, 904 Bolivia, El Paso, Tex. 79903

[21] Appl. No.: 238,773

[22] Filed: Aug. 31, 1988

[51] Int. Cl.⁵ .............................................. B60P 7/14
[52] U.S. Cl. .................................. 410/132; 410/141; 296/100; 296/37.6
[58] Field of Search ............... 410/129, 130, 132, 135, 410/137, 140, 141, 142; 296/100

[56] References Cited

U.S. PATENT DOCUMENTS

| | | | |
|---|---|---|---|
| 2,697,631 | 12/1954 | Miller | 410/140 |
| 4,278,376 | 7/1981 | Hunter | 410/130 |
| 4,406,493 | 9/1983 | Albrecht et al. | 296/100 |
| 4,418,954 | 12/1983 | Buckley | 296/100 |
| 4,435,010 | 3/1984 | Mandel | 296/100 |
| 4,507,033 | 3/1985 | Boyd | 410/140 X |
| 4,722,646 | 2/1988 | McIntyre | 410/137 X |
| 4,730,866 | 3/1988 | Nett | 296/100 |
| 4,770,461 | 9/1988 | Lovaas | 296/100 |

Primary Examiner—Johnny D. Cherry
Assistant Examiner—Gary C. Hoge

[57] ABSTRACT

A modularized system for enclosing selected portions of a pickup truck bed is presented. The system comprises at least one pair of vertical partition holders, at least one vertical partition, a front frame coupled to the front of the pickup bed, a pair of hollow receptacles, a rear gate frame, a sliding locking spacer and a fixed locking spacer which couple together to enclose selected volumes of the pickup truck bed. Additional vertical partition holders and vertical partitions can be coupled to form additional enclosed modules. The modules can be quickly and easily removed and installed to vary the volume enclosed for the greatest usefulness and utility of the user of the pickup.

1 Claim, 2 Drawing Sheets

TRUCK CARGO SAFEGUARD

BACKGROUND OF THE INVENTION

1. Field of the Invention

The present invention relates to modularized systems for enclosing selected portions of a pickup truck bed.

2. Description of the Prior Art

Applicant has formerly filed an application, since abandoned, for a system to lock selected items into a pickup truck bed. The prior art includes a number of systems for locking selected items into or to a pickup truck bed.

Pickup truck beds are designed for versatility. One can place a wide variety of machines or other cargo into a pickup truck bed for transportation. The only practical limitation is that the items cannot be larger in any dimension than the maximum size in that dimension of the pickup bed, and less frequently, cannot be too heavy, fragile, etc. The practical rule in most cases, however, is that anything that can fit can be carried in a pickup bed.

Unfortunately, a pickup bed is exposed to the outer world. Anyone can see the contents. If the pickup is left unattended, anyone can remove and steal the contents. In addition, some items are not water proof, or are subject to damage if exposed to sun, wind which might be quite strong when the pickup is traveling, or other damage such as vandalism when the contents of the pickup bed are exposed.

Tarpaulins or other covers offer some protection under certain conditions or circumstances. Fitted enclosures can be carried in pickup beds and offer good protection under certain circumstances. Unfortunately neither these nor any of the prior art furnishes substantial protection and convenience while permitting the pickup bed to retain the relatively large capacity and flexibility which are the primary reasons many purchase pickups.

SUMMARY OF THE INVENTION

A modularized system for enclosing selected portions of a pickup truck bed is presented. The system, called a truck cargo safeguard, comprises at least one pair of vertical partition holders, at least one vertical partition, a front frame, a pair of substantially symmetrical hollow receptacles, a rear gate frame, a sliding locking spacer and a fixed locking spacer.

At least one pair of vertical partition holders are substantially fixedly coupled to each interior side of the pickup bed selected equal distances from the front and gate of the pickup bed, the exterior surface of each holder defining a vertical slot therethrough on the interior side surface of the pickup bed, the vertical slots facing each other. Additional partition holders may be utilized to increase the enclosed storage volume or number of storage modules.

At least one vertical partition of height slightly less than the height of the pickup bed and of width such that the edge of the partition are slideably removably coupled within the vertical slots through opposing vertical partition holders is utilized.

A front frame is substantially fixedly coupled along the entire front top edge of the pickup bed.

A pair of substantially symmetrical hollow receptacles are utilized. One receptacle is fixedly coupled along the entire length of each top side of the pickup bed. The surface of each receptacle defines a plurality of identical dimension holes therethrough on the surface of each receptacle closest to the center of the pickup bed. The receptacles differ only in that one receptacle, called a locking receptacle, has a lock spacer having surfaces defining locking holes, and the other receptacle, called the passive receptacle, has a passive spacer having no holes.

A rear gate frame is substantially fixedly coupled along substantially the entire width of the rear gate such as to form a rectangle with the front frame and the pair of locking receptacles when the gate is raised.

A sliding locking spacer is disposed inside only the locking receptacle. The sliding locking spacer slides between two positions, a locked position and a unlocked position. The locking spacer surface defines one hole therethrough for each hole through the locking receptacle and of substantially identical dimensions to the hole through the locking receptacle, the holes through the sliding locking spacer being disposed so as to form a straight line with pairs of holes through the receptacles when the locking spacer is in the unlocked position.

A fixed locking spacer is coupled within the locking receptacle.

To utilize the truck cargo safeguard, the front frame is bolted or otherwise fixedly coupled to the front top edge of the pickup bed. The rear gate frame is then bolted or otherwise fixedly coupled to the rear gate top edge. The front frame and rear gate frames are of identical length in a first example and are installed at the same height above the floor of the pickup bed. The hollow receptacles are then installed along the top of each side of the pickup bed to form a rectangle with the front frame and rear gate frame. The preceding four elements are normally left permanently installed on the pickup which can still be used as an ordinary pickup truck.

When it is desired to install a modularized enclosed compartment, the compartment is installed as follows: Each of the pair of vertical partition holders is coupled by bolting or other coupling to the sides of the truck an equal distance from the front of the pickup bed.

The vertical partition is then slid down into the vertical partition holders to form a rectangle with the front of the pickup bed. Additional vertical partition holders and partitions are installed in a similar manner in selected parts of the pickup bed if it is desired to form additional storage modules or to form a storage module not adjacent the front of the pickup bed. A cover is then slid into the top of each of the two receptacles formerly installed at the sides of the pickup bed as follows: The cover is first angled down on the side closest to the locking receptacle, the locking spacer of which is in the open configuration, and slid into the locking receptacle. The end farthest from the locking receptacle is then lowered so that the cover is substantially parallel to the receptacles, and said farthest end from the locking receptacle is then slid as far as it will go into the passive receptacle. The locking spacer is then slid into the locked position and the locking spacer is then locked into the locked position by a lock. The preceding is reversed for opening the module or removing the module. Additional modules are installed as previously described. A module twice as long from front to rear of the truck can be installed by constructing two adjacent modules with no partition therebetween. A partition channel at the side of each module permits one cover to be removed without removing adjacent covers.

DRAWING DESCRIPTION

Reference should be made at this time to the following detailed description which should be read in conjunction with the following drawings of which:

DETAILED DESCRIPTION OF THE INVENTION

Figure 1:
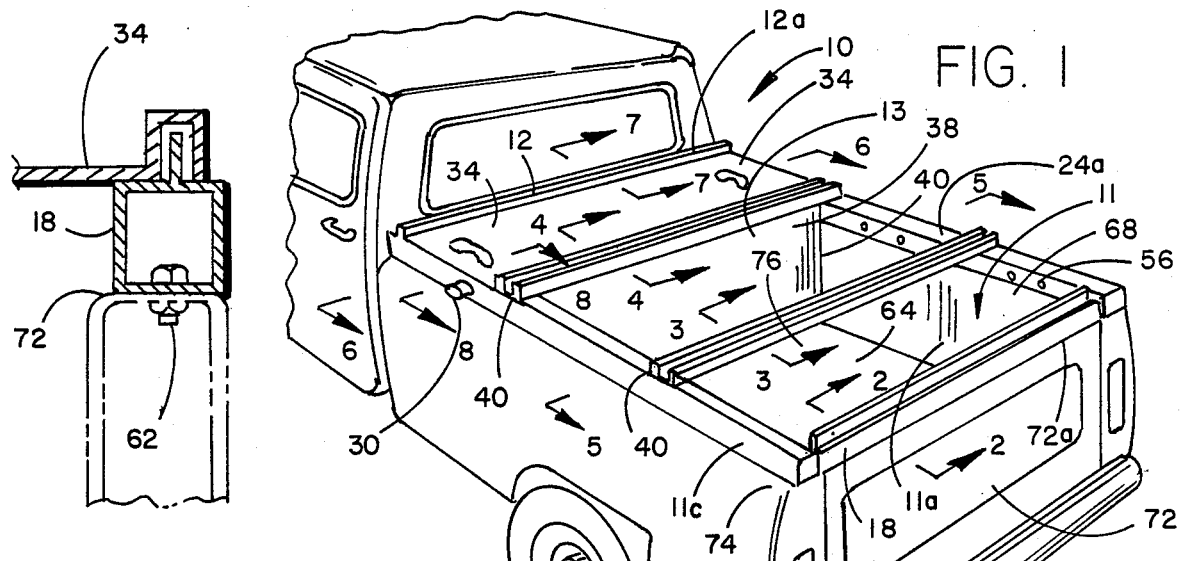
FIG. 1 is a ¾ elevated view of a pickup truck bed illustrating the invention.
Figures 2, 3, 4:
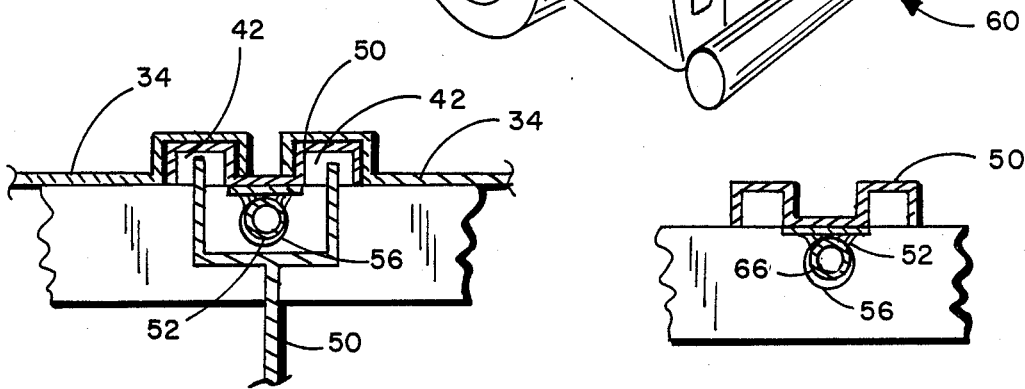
FIG. 2 is a partially cut away view of the invention along the line 2—2 of FIG. 1.
FIG. 3 is a partially cut away view of the invention along the line 3—3 of FIG. 1.
FIG. 4 is a partially cut away view of the invention along the line 4—4 of FIG. 1.
Figure 6:
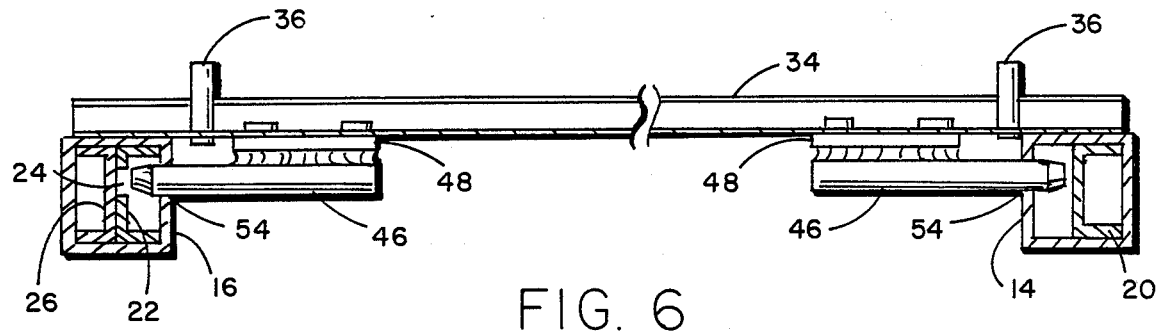
FIG. 6 is a partially cut away view of the invention along the line 6—6 of FIG. 1.
Figure 5:
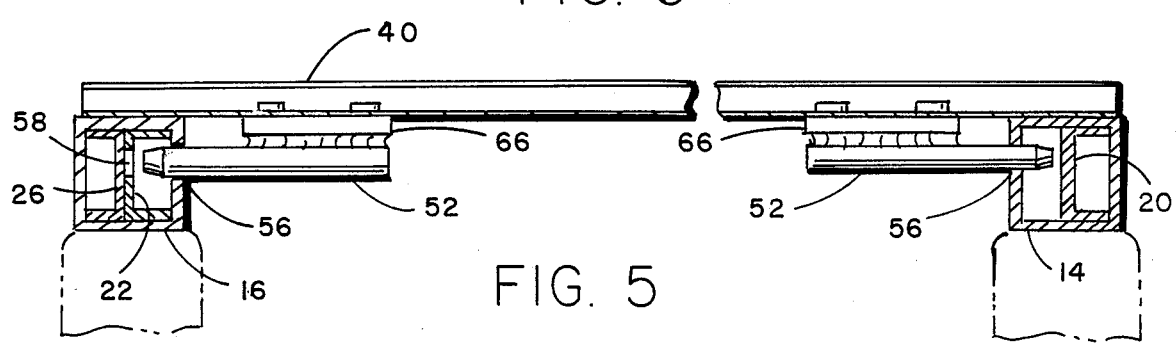
FIG. 5 is a partially cut away view of the invention along the line 5—5 of FIG. 1.
Figure 7:
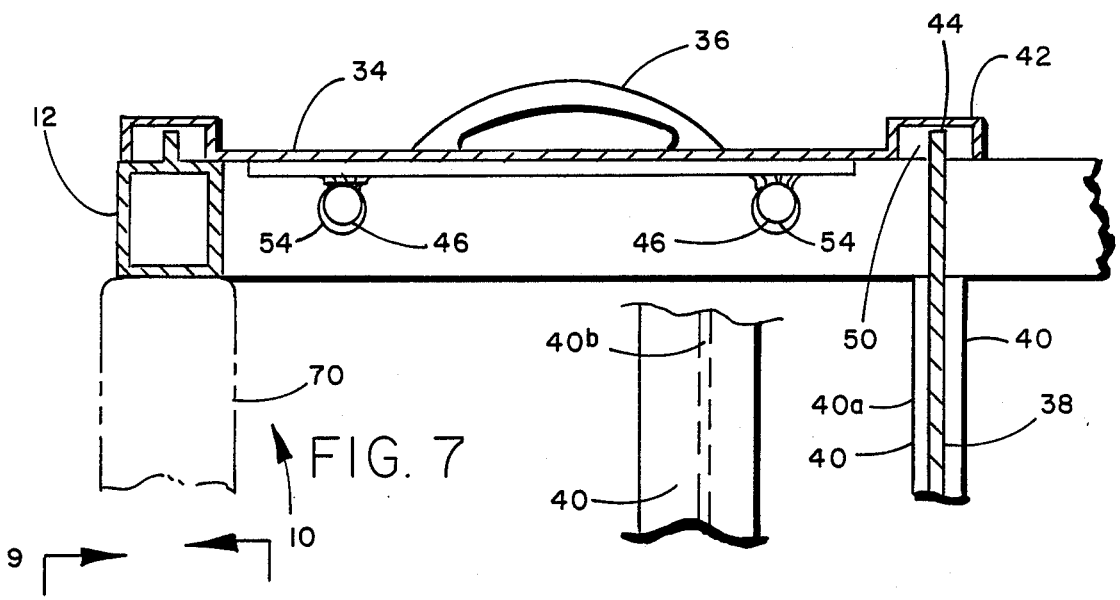
FIG. 7 is a side view of a vertical partition holder.
Figure 8:
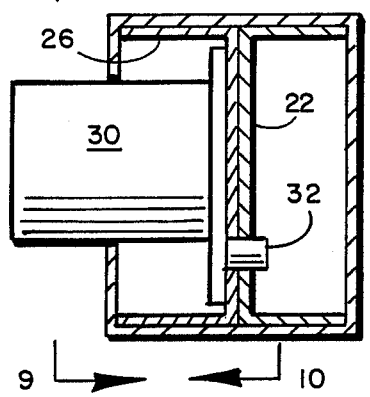
FIG. 8 is a away view of the invention along the line 8—8 of FIG. 1.
Figure 9:
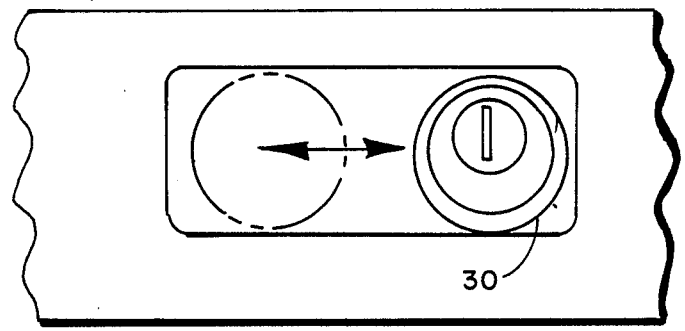
FIG. 9 is a view of the lock along the line 9—9 on FIG. 8.
Figure 10:
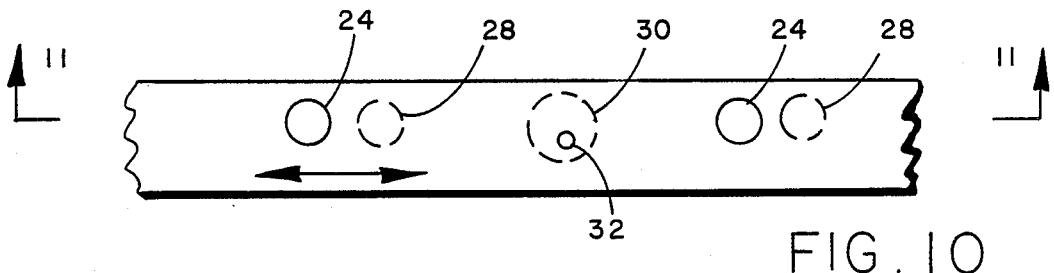
FIG. 10 is a view of the spacer holes along the line 10—10 on FIG. 8.
Figure 11:
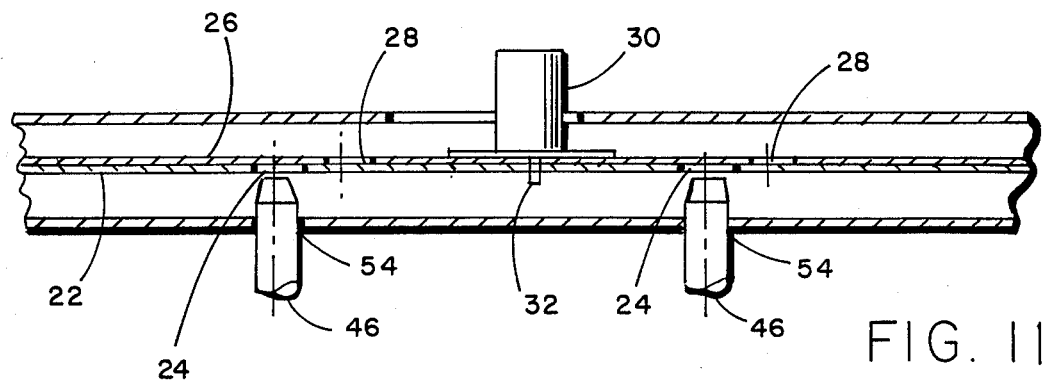
FIG. 11 is a partially cut away top view along the line 11—11 on FIG. 10.

A modularized system 10 for enclosing selected portions of a pickup truck bed 11 is presented. The system 10, called a truck cargo safeguard 10, comprises at least one pair of vertical partition holders 40, at least one vertical partition 38, a front frame 12, a pair of substantially symmetrical hollow receptacles 14,16, a rear gate frame 18, a sliding locking spacer 26 and a fixed locking spacer 22.

At least one pair of vertical partition holders 40 are substantially fixedly coupled to each interior side 11a of the pickup bed 11 selected equal distances from the front frame 12 and gate 72 of the pickup bed 11, the exterior surface 40a of each holder defining a vertical slot 40b therethrough on the interior side surface 11a of the pickup bed 11, the vertical slots 40b facing each other. Additional partition holders 40 may be utilized to increase the enclosed storage volume or number of storage modules 13.

At least one vertical partition 38 of height slightly less than the height of the pickup bed 11 and of width such that the edges 44 of the partition are slideably removably coupled within the vertical slots 40b through opposing vertical partition holders 40 is utilized.

A front frame 12 is substantially fixedly coupled along the entire front top edge 12a of the pickup bed.

A pair of substantially symmetrical hollow receptacles 14, 16 are utilized. One receptacle 14, 16 is fixedly coupled along the entire length of each top side 11c of the pickup bed 11. The surface of each receptacle 14, 16 defines a plurality of identical dimension holes 56 therethrough on the surface 24a of each receptacle 14, 16 closest to the center of the pickup bed. The receptacles 14, 16 differ only in that one receptacle 16, called a locking receptacle 16 has a locking spacer 26 having surfaces defining locking holes 28, and the other receptacle 14, called the passive receptacle 14 has a passive spacer 20 having no holes.

A rear gate frame 18 is substantially fixedly coupled along substantially the entire width of the rear gate 72 such as to form a rectangle with the front frame 12 and the pair of locking receptacles 14, 16 when the gate 72 is raised.

A sliding locking spacer 26 is disposed inside only the locking receptacle 16. The sliding locking spacer 26 slides between two positions, a locked position and an unlocked position. The locking spacer surface 22a defines one hole 28 therethrough for each hole 24 through the fixed locking spacer 16 and of substantially identical dimensions to the hole through the fixed locking spacer, the holes 28 through the sliding locking spacer 26 being disposed so as to form a straight line with pairs of holes 56 through the receptacles 14, 16 when the locking spacer 26 is in the unlocked position.

A fixed locking spacer 32 is coupled within the locking receptacle 16.

To utilize the truck cargo safeguard 10, the front frame 12 is bolted or otherwise fixedly coupled to the front top edge 12a of the pickup bed 11. The rear gate frame 72 is then bolted or otherwise fixedly coupled to the rear gate 18 top edge 72a. The front frame 12 and rear gate frame 18 are of identical length in a first example and are installed at the same height above the floor 64 of the pickup bed 11. The hollow receptacles 14, 16 are then installed along the top of each side of the pickup bed 11 to form a rectangle with the front frame 12 and rear gate frame 18. The preceding four elements are normally left permanently installed on the pickup which can still be used as an ordinary pickup truck.

When it is desired to install a modularized enclosed compartment module 13, the module 13 is installed as follows: Each of the pair of vertical partition holders 40 is coupled by bolting or other coupling to the sides 11a of the pickup truck bed 11 an equal distance from the front 12a of the pickup bed 11.

The vertical partition 38 is then slid down into the vertical partition holders 40 to form a rectangle with the front frame 12 on the pickup bed 11. Additional vertical partition holders 40 and partitions 38 are installed in a similar manner in selected parts of the pickup bed 11 if it is desired to form additional storage modules 13 or to form a storage module 13 not adjacent the front frame 12 of the pickup bed 11. A cover 34 is then slid into the top of each of the two receptacles 14, 16 formerly installed at the sides 11a of the pickup bed 11 as follows: The cover 34 is first angled down on the side closest to the locking receptacle 16, the sliding locking spacer 26 of which is in the open configuration, and the cover rods 52 are slid into the sliding locking spacer 26 holes 28. The end farthest from the locking receptacle 16 is then lowered so that the cover 34 is substantially parallel to the receptacles 14, 16, end the rods 52 of said farthest end from the locking receptacle 16 is then slid as far as it will go into the passive receptacle 14 holes 56. The sliding locking spacer 26 is then slid into the locked position and the sliding locking spacer 26 is then locked into the locked position by a lock 30. The preceding is reversed for opening the module 13 or removing the module 13. Additional modules 13 are installed as previously described. A module 13 twice as long from front to rear of the truck bed 11 can be installed by constructing two adjacent modules 13 with no partition 38 therebetween. A partition channel 50 at the side of each module 13 permits one cover 34 to be removed without removing adjacent covers 34.

A particular example of the invention has been described herein. Other examples will be obvious to those skilled in the art. The invention is limited only by the following claims.

I claim:

1. A modularized system for enclosing selected portions of a pickup truck bed, comprising:
   at least one pair of vertical partition holders substantially fixedly coupled to each interior side of the pickup bed selected equal distances from the front and gate of the pickup bed, the exterior surface of each holder defining a vertical slot therethrough on the interior side surface of the pickup bed, the vertical slots facing each other;
   at least one vertical partition of height slightly less than the height of the pickup bed and of width such that the edges of the partition are slideably removably coupled within the vertical slots through opposing vertical partition holders;
   a front frame substantially fixedly coupled along the entire front top edge of the pickup bed;
   a pair of substantially symmetrical hollow receptacles, one fixedly coupled along the entire length of each top side of the pickup bed, the surface of each receptacle defining a plurality of identical dimension holes therethrough on the surface of each receptacle closest to the center of the pickup bed, the receptacles differing only in that one receptacle, called a locking receptacle has a locking spacer having surfaces defining locking holes, and the other receptacle, called the passive receptacle has a passive spacer having no holes;
   a rear gate frame substantially fixedly coupled along substantially the entire width of the rear gate such as to form a rectangle with the front frame and the pair of locking receptacles when the gate is raised;
   a sliding locking spacer disposed inside only the locking receptacle, the sliding locking spacer sliding between two positions, a locked position and an unlocked position, the locking spacer surface defining one hole therethrough for each hole through the locking receptacle and of substantially identical dimensions to the hole through the locking receptacle, the holes through the sliding locking spacer being disposed so as to form a straight line with pairs of holes through the receptacles when the locking spacer is in the unlocked position, and
   a fixed locking spacer coupled within the locking receptacle.

* * * * *